Jan. 15, 1952  H. A. DVORAK ET AL  2,582,481
TEMPERATURE-CONTROLLED SOLDERING IRON
Filed Dec. 16, 1950
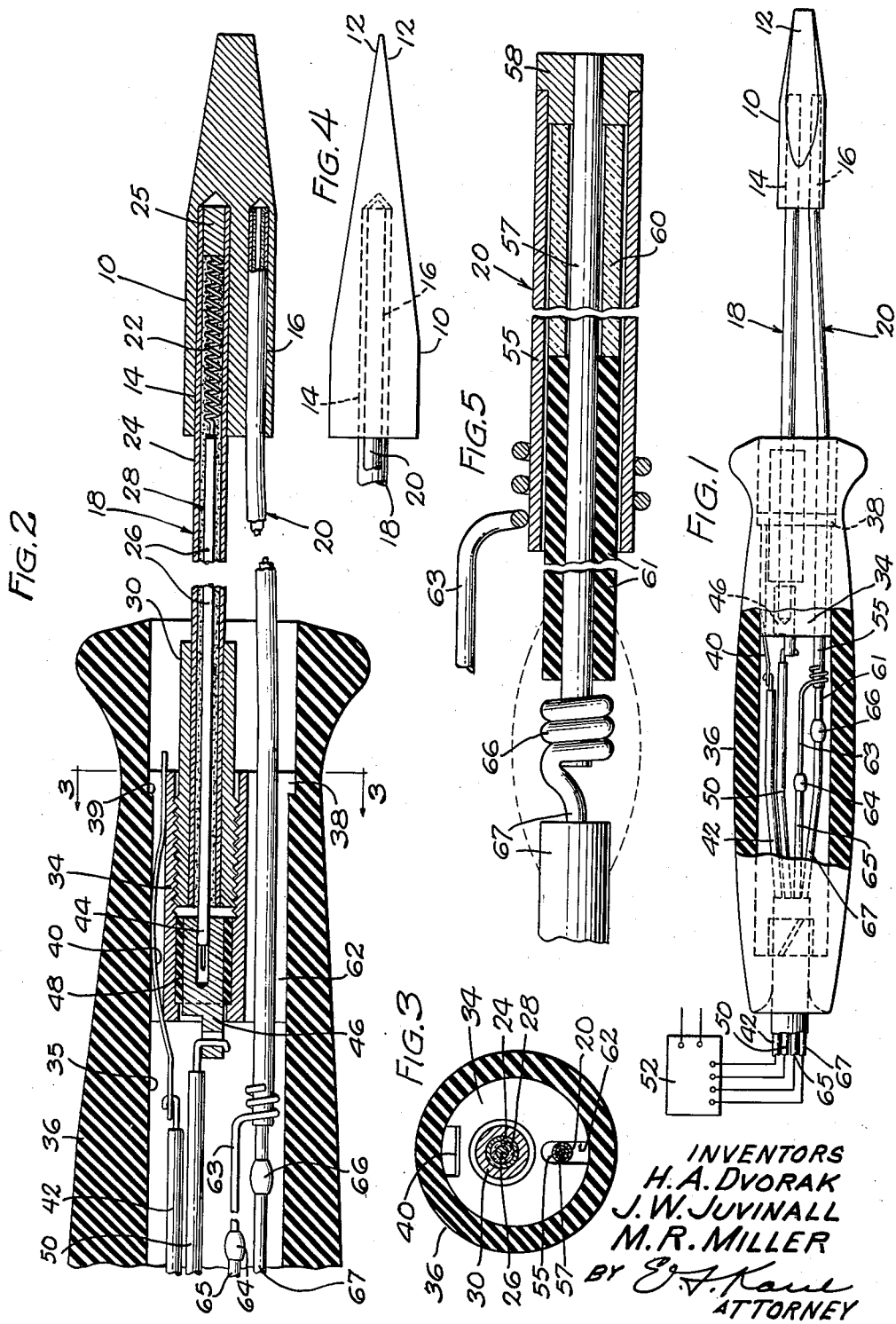

Patented Jan. 15, 1952

2,582,481

UNITED STATES PATENT OFFICE 2,582,481

TEMPERATURE-CONTROLLED
SOLDERING IRON

Howard A. Dvorak, Brookfield, Ill., James W. Juvinall, Indianapolis, Ind., and Merton R. Miller, Lombard, Ill., assignors to Western Electric Company, Incorporated, New York, N. Y., a corporation of New York Application December 16, 1950, Serial No. 201,148

9 Claims. (Cl. 219—26)

This invention relates to electrically heated soldering irons and more particularly to a temperature controlled soldering iron having a thermo-responsive element in the tip thereof connected to a remote control device for varying the power supplied to the soldering iron.

In the electrically heated soldering iron art various mechanisms have been devised for controlling the heat supplied to the tip of the iron, most of which included a thermostatic switch which because of its size has to be remotely positioned from the work area of the tip of the soldering iron so that it cannot respond to the variation in temperature in the work area with sufficient speed and accuracy to maintain a substantially uniform temperature in the tip of the soldering iron.

It is an object of the present invention to provide a temperature controlled soldering iron of improved construction.

Another object is to provide a temperature controlled soldering iron having a thermo-responsive control element in the tip thereof for use with a remote control device for controlling the power supplied to the iron.

In accordance with one embodiment of the invention, the soldering iron is provided with a tip having a pair of longitudinally extending recesses into one of the which is brazed one end of a tubular heating element, the other end of which is connected to a socket which in turn is mounted within a hollow handle for supporting the iron. Into the other recess of the tip, the hot junction end of a tubular thermo-couple element is brazed, the other end of the element being positioned within the hollow handle and connected through leads to a remote control unit which regulates the current supplied through leads connected to terminals on the socket for the heating element. The thermo-couple is mounted in spaced relation to the heating element and comprises a tubular element of one metal mounted in telescoping relation about a wire element of another metal and insulated from each other by a ceramic tube, one end of each of the elements being welded together to form a hot junction, and the remainder of the elements being free to expand longitudinally relative to each other.

Other objects and advantages of the invention will become apparent by reference to the following description thereof and the accompanying drawings illustrating a preferred embodiment of the invention in which:

Fig. 1 is a side elevational view of the soldering iron;

Fig. 2 is an enlarged longitudinal sectional view of a portion of the soldering iron;

Fig. 3 is a transverse cross-sectional view taken on the line 3—3 of Fig. 2

Fig. 4 is a fragmentary side elevational view of the tip portion of the soldering iron; and Fig. 5 is an enlarged detailed view of the thermo-couple element with portions thereof broken away and portions shown in section.

The soldering iron selected to illustrate the invention is of the miniature type having a relatively small tip suitable for use in soldering connections to terminals on apparatus such as telephone equipment where the terminals are positioned close to each other. The tip 10 of the soldering iron is partly cylindrical in shape and has its forward end defined by converging flat surfaces to form a work area 12 adjacent the forward end thereof. A pair of cylindrical recesses or bores 14 and 16 are formed in the tip and extend longitudinally from the rear end thereof in parallel relation to each other. The forward end of a rod-like heating unit 18 is inserted into the bore 14 and secured therein by brazing. Into the bore 16 is secured, as by brazing, the forward end of a tubular shaped or rod-like thermo-couple element 20.

The heating unit 18 comprises a helical resistance element 22 mounted within the forward end of a metal tube 24 and insulated therefrom, and the element 22 has one end bonded to a plug 25 which is within and bonded to the end portion of the tube 24. At its other end the resistance element 22 is connected to a rod or lead wire 26 extending axially within the tube and beyond the end thereof and insulated from the tube by any suitable insulation 28. The tube 24 at its other end has a sleeve 30 bonded thereto which is provided with exterior threads and which is removably secured in an internally threaded socket or receptacle 34.

The receptacle 34 has a cylindrical outer surface and is removably mounted in the bore 35 of a handle member 36 of insulating material. A flange 38 at the forward end of the receptacle 34 fits against a shoulder 39 in the bore 35 of the handle to position the receptacle axially within the handle, and the receptacle is frictionally retained in position within the handle by a flat spring member 40 fitting in a recess in the receptacle 34 and engaging the inner surface of the handle 36. One end of the spring member 40 extends beyond the receptacle and forms a terminal to which a conductor lead 42 is connected. The end 44 of the lead 26 of the heating element 18 engages a hollow cylindrical terminal member 46 carried by the receptacle 34 and insulated therefrom by a sleeve of insulating material 48. A portion of the terminal 46 extends outwardly from the receptacle 34 and is connected to a conductor 50 which together with the conductor 42 electrically connect the heating element to a power circuit in a remote control unit 52, Fig. 1. When the soldering iron is operating, current from the power circuit flows through the conductor 42, the spring terminal member 46, receptacle 34, tubular members 30 and 24, the resistance heating element 22, the lead wire 26, the terminal 46 and the conductor 50.

Any suitable type of remote control unit may be used which will function to supply varying amounts of current to the soldering iron under control of the thermo-couple to replace the heat dissipated by the tip and maintain a substantially uniform temperature in the tip.

The thermo-couple unit 20 is in the form of a rigid rod-like structure comprising an outer tubular element 55 of one metal, as for example stainless steel, and an inner element in the form of a rod or wire 57 of another metal, as for example constantan, disposed in telescoping relation to the outer element. At its forward end the wire element 57 fits into an aperture in a steel plug 58 and is welded thereto, and the tubular element 55 at its forward end telescopingly engages a rabited portion of the plug and is welded thereto to form a hot junction between the elements 55 and 57 of the thermo-couple. The elements 55 and 57 are maintained in spaced relation to each other by a ceramic tube 60 and a flexible sleeve 61 of insulating material. The ceramic tube 60 which extends from the plug 58 substantially the full length of the tubular element 55 and terminates within the tube a short distance from the end thereof, is loosely mounted relative to the elements 55 and 57 to permit longitudinal movement of the elements relative to each other during the expansion and contraction thereof resulting from variation in the temperatures thereof. The flexible sleeve 61 permits a slight flexing of the free end of the inner element 57.

The thermo-couple element 20 extends from the tip 10 in spaced relation to and substantially parallel with the heating element 18, and the free end of the element extends through a slot 62 in the receptacle 34, the slot 62 permitting longitudinal expansion and contraction of the element 20. The end of the outer tubular element 55 of the thermo-couple 20 is positioned a substantial distance from the end of the receptacle 34 and has connected thereto one end of an iron wire 63, the other end of which is connected at 64 to a conductor 65. The inner element 57 of the thermo-couple extends a substantial distance beyond the end of the outer element 55 and at its end is connected at 66 to a conductor 67 which together with the conductor 65 are connected to the control circuit of the remote control device 52 and serve to electrically connect the thermo-couple 20 thereto. The connections 64 and 66 which form the cold junction of the thermo-couple are spaced a substantial distance from each other and from the socket member 34 so that they are beyond the influence of the heat radiated from the socket member 34, which heat is conducted to the socket member from the heating element and the heated tip 10. In this manner, the heat radiated from the socket member 34 does not effect the cold junction of the thermo-couple and the cold junction of the thermo-couple functions in a substantially uniform temperature, namely, room temperature.

The tip 10, which is supported on the ends of the two rigid elements 18 and 20 in spaced relation to the handle 36, may be removed from the elements 18 and 20 by heating the tip 10, as for example, in an induction heating coil until the brazing material bonding the tip to the elements has softened after which the tip may be pulled from the elements and another tip replaced thereon if desired.

Both the heating element 18 and the thermo-couple element 20 are replaceable so that in case of failure of either of the elements it may be removed from the soldering iron and a new element substituted. After the tip 10 has been removed, if the heating element 18 is defective, it may be unscrewed from the socket 34 and a new element substituted therefor. If the thermo-couple 20 is defective, the receptacle 34 may be withdrawn axially from the handle 36 and the conductors 63 and 67 disconnected from the inner and outer elements 55 and 57 of the thermo-couple and a new thermo-couple unit 20 substituted therefor and electrically connected to the conductors 63 and 67. The thermo-couple unit 20 may then be reinserted in the slot 62 in the receptacle 34 and the receptacle reinserted within the handle 36, after which another tip 10 may be applied to the ends of the elements 18 and 20 and brazed thereto.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A soldering iron comprising a metal tip having a pair of recesses extending longitudinally from the rear end thereof, a rod-like heating unit and a rod-like thermo-couple arranged side-by-side in spaced relation to each other and having their forward ends mounted in the recesses of said tip, said thermo-couple comprising a wire element of one metal and a tubular element of another metal disposed about said wire element in coaxial relation thereto and bonded at one end to one end of the wire to form a hot junction within said tip, and insulating means loosely supporting said elements in spaced relation to each other, means including a handle disposed in spaced relation to said tip for supporting said heating unit and said thermo-couple, and means for connecting said heating unit and said thermo-couple to a power circuit and a control circuit, respectively, of a remote control unit.

2. A soldering iron comprising a metal tip having a pair of recesses extending longitudinally from the rear end thereof, a rod-like heating unit and a rod-like thermo-couple element arranged side-by-side in spaced relation to each other and having their forward ends mounted in said recesses and brazed to said tip, an apertured handle for receiving the rear ends of said heating unit and said thermo-couple, socket means removably mounted within said recessed handle and detachably connectible to a power circuit of a remote control device, said thermo-couple comprising a wire element of one metal, and a tubular element of another metal disposed about said wire element in coaxial relation thereto and welded at one end to one end of the wire to form a hot junction within said tip, and insulating means loosely supporting said elements in spaced relation to each other.

3. A soldering iron comprising a metal tip having a pair of recesses extending longitudinally therein from the rear end thereof, a rod-like heating unit and a rod-like thermo-couple arranged side-by-side in spaced relation to each other and having their forward ends mounted in said recesses and bonded to said tip, an apertured handle for receiving the rear ends of said heating unit and said thermo-couple, means for removably supporting said heating unit and said thermo-couple in said handle and for permitting longitudinal movement of said thermo-couple relative to said heating unit, said thermo-couple comprising a wire element of one metal, a tubular element of another metal disposed about said wire element in coaxial relation thereto and bonded at one end to one end of the wire to form a hot junction within said tip, and insulating means loosely supporting said elements in spaced telescoping relation to each other, and means for electrically connecting said heating unit and said thermo-couple to a power circuit and a control circuit, respectively, of a remote control unit.

4. A soldering iron comprising a metal tip having a pair of recesses extending longitudinally therein from one end thereof, a rodlike heating unit and a rod-like thermo-couple arranged side-by-side in spaced relation to each other and having their forward ends mounted in the recesses in said tip, means including a handle disposed in spaced relation to said tip and enclosing the rear portions of said heating unit and said thermo-couple for supporting said heating unit and said thermo-couple, said thermo-couple comprising an outer tubular conductor of one metal, an inner conductor of another metal connected to said outer conductor to form a hot junction within said tip, insulating means for loosely supporting said conductors in spaced relation to each other, conductors connected to the inner and outer conductors of said thermo-couple to form a cold junction within said handle and in spaced relation to said tip, said conductors being connectible to a control circuit of a remote control unit, and means for electrically connecting said heating unit to a power circuit of the remote control unit.

5. A soldering iron comprising a metal tip having a pair of recesses extending longitudinally therein from one end thereof, a rod-like heating unit and a rod-like thermo-couple arranged side-by-side in spaced relation to each other and having their forward ends mounted in the recesses in said tip, an apertured handle for receiving the rear end portions of said heating unit and said thermo-couple, means for supporting said heating unit and said thermo-couple in said handle and permitting longitudinal movement of said thermo-couple relative to said heating unit, said thermo-couple comprising a wire element of one metal, a tubular element of another metal disposed about said wire element and joined to said wire to form a hot junction within said tip, a sleeve of ceramic insulation on said wire element for loosely supporting the wire and tubular elements of the thermo-couple in telescopingly relation, said ceramic sleeve being disposed within said tubular element and having one end thereof terminating in spaced relation to the end of said tubular element, a flexible sleeve of insulation mounted on said wire element with an end thereof in abutting relation to said ceramic sleeve and extending longitudinally beyond said end of the tubular element, means for electrically connecting said heating unit to a power circuit of a remote control unit, and means for electrically connecting the element of the thermo-couple to a control circuit of said remote control unit.

6. In a soldering iron, the combination of a metal tip having a pair of recesses extending longitudinally therein from one end thereof, a rod-like heating unit and a rod-like thermo-couple arranged side-by-side in spaced relation to each other and having their forward ends mounted in said recesses and bonded to said tip, said heating unit comprising an outer tubular metallic conductor, a coiled resistance element mounted within said tubular conductor and said tip and having one end thereof electrically connected to said tubular conductor, an inner conductor within said tubular conductor connected to the other end of said resistance element and extending beyond the end of said outer conductor, and insulating means for maintaining said inner conductor and said resistance element in spaced relation to said outer conductor, said thermo-couple comprising a wire element of one metal, a tubular element of another metal disposed about said wire element in coaxial relation thereto and bonded at one end to one end of the wire element to form a hot junction within said tip, and insulating means loosely supporting said elements in spaced relation to each other, means including a handle enclosing the rear portions of said heating unit and said thermo-couple for supporting said heating element and said thermo-couple, means for electrically connecting the inner and outer conductors of said heating unit to a power circuit of a remote control unit, and means for electrically connecting the wire and tubular elements of said thermo-couple to a control circuit of a remote control unit.

7. A soldering iron comprising a metal tip having a pair of recesses extending longitudinally therein from one end thereof, a rod-like heating unit and a rod-like thermo-couple arranged side-by-side in spaced relation to each other and having their forward ends mounted in said recesses and bonded to said tip, a recessed handle for receiving the rear end portions of said heating unit and said thermo-couple, said heating unit comprising an outer metallic tubular conductor, a coiled resistance element mounted within said tubular conductor and said tip and having one end thereof electrically connected to said tubular conductor, an inner conductor within said tube connected to the other end of said resistance element, and insulating means for maintaining said inner conductor and said resistance element in spaced relation to said tubular conductor, said heating unit having external threads thereon, a threaded socket member removably mounted within said handle for threadedly receiving said heating unit for supporting said unit, a terminal mounted on and insulated from said socket member for receiving said inner conductor, a terminal on said socket member, said terminal members being connectible to a power circuit of a remote control unit for supplying current to said heating element, said thermo-couple comprising a tubular element of one metal and a wire element of another metal disposed in telescoping relation to said tubular element and being bonded thereto at one end to form a hot junction within said tip, one end of said wire element extending beyond the end of said tubular element, insulating means for loosely supporting said elements in spaced relation to each other comprising a rigid sleeve of insulation disposed within said tubular member and in spaced relation to the free end thereof, and a flexible sleeve of insulation extending within and beyond said tubular member, and means for electrically connecting the wire and tubular elements of the thermo-couple to a control circuit of a remote control unit.

8. A soldering iron comprising a metal tip having a pair of recesses extending longitudinally therein from one end thereof, a rod-like heating unit and a rod-like thermo-couple arranged side-by-side in spaced relation to each other and having their forward ends mounted in the recesses in said tip, said heating unit comprising an outer tubular metallic member, a coiled resistance element mounted within said tubular member and said tip and having one end thereof electrically connected to said tubular member, an inner conductor member within said tube connected to the other end of said resistance element and extending beyond the end of said tubular member, and insulating means for maintaining said inner member and said resistance element in spaced relation to said tubular outer member, an apertured handle for receiving the rear end portions of said heating unit and said thermo-couple, a socket member removably mounted within said handle for removably receiving one end of the heating unit for supporting said unit, terminal means engageable with the inner and outer members of said heating unit and connectible to a power circuit of a remote control unit, said thermo-couple comprising a wire element of one metal, a tubular element of another metal disposed in telescoping relation to said wire element and joined thereto to form a hot junction within said tip, a rigid insulating sleeve loosely mounted within said tubular element and extending from said hot junction to a point in spaced relation to the end of said tubular element, a flexible insulating sleeve on said wire element extending from said rigid sleeve of insulation to a point beyond the end of said tubular element, said wire element being longer than said tubular element and extending beyond the free end thereof, and means for electrically connecting the tubular element and the wire element of said thermo-couple to a control circuit of the remote control unit.

9. A soldering iron comprising a metal tip having a pair of recesses extending longitudinally from the rear end thereof, a rod-like heating unit and a rod-like thermo-couple unit arranged side-by-side in spaced relation to each other and having their forward ends mounted in the recesses of said tip, said thermo-couple unit comprising a pair of elongated conductor elements of dissimilar metals bonded together at one end to form a hot junction within said tip, and insulating means for maintaining said elongated conductor elements in spaced relation to each other except at said hot junction, means including a handle disposed in spaced relation to said tip for supporting said heating unit and said thermo-couple unit, and means for connecting said heating unit and said thermo-couple unit to a power circuit and a control circuit, respectively, of a remote control unit.

HOWARD A. DVORAK.
JAMES W. JUVINALL.
MERTON R. MILLER.

REFERENCES CITED

The following references are of record in the file of this patent:

FOREIGN PATENTS

| Number | Country | Date |
|---|---|---|
| 588,216 | Great Britain | May 16, 1947 |